United States Patent [19]
Demópoulos et al.

[11] Patent Number: 5,672,280
[45] Date of Patent: Sep. 30, 1997

[54] MULTIPLE STAGE PRECIPITATION OF HEAVY METALS FROM ACIDIC AQUEOUS SOLUTION

[75] Inventors: George P. Demópoulos, Outremont; Janice M. Zinck; Peter D. Kondos, both of Ottawa, all of Canada

[73] Assignees: Her Majesty the Queen in right of Canada, as represented by the Minister of Natural Resources; McGill University, both of Canada

[21] Appl. No.: 452,000

[22] Filed: May 26, 1995

[51] Int. Cl.⁶ .................................. B01D 21/00
[52] U.S. Cl. .............. 210/709; 210/724; 210/726; 210/743; 210/912; 423/104; 423/140
[58] Field of Search .................... 210/724, 709, 210/726, 743, 912, 913, 914; 423/104, 106, 142, 101, 140

[56] References Cited

U.S. PATENT DOCUMENTS 4,278,539  7/1981  Santhanam et al. .
4,338,200  7/1982  Zeijlstra .
5,128,047  7/1992  Stewart et al. .
5,262,063  11/1993  Yen .

FOREIGN PATENT DOCUMENTS 2084327  2/1966  Canada .

OTHER PUBLICATIONS

Unit Operations of Chemical Engineering by Warren L. McCabe and Julian C. Smith, 1956, pp. 602–609.

*Primary Examiner*—Robert Popovics
*Attorney, Agent, or Firm*—Jones, Tullar & Cooper, P.C.

[57] ABSTRACT

For the removal of heavy metal contaminants from industrial waste water, a method is proposed for preparing a dense precipitate having superior handling and disposal properties. The method comprises incremental adjustment of the pH to maintain a low saturation ratio and recycling of slurry to provide seed crystals for secondary nucleation.

9 Claims, 7 Drawing Sheets

MULTIPLE STAGE PRECIPITATION OF HEAVY METALS FROM ACIDIC AQUEOUS SOLUTION

BACKGROUND OF THE INVENTION

1. Field of the Invention

The present invention relates to a method of removing heavy metal ions from effluent waste water. In particular, the invention is directed to a multiple stage process for preparing a denser, more manageable heavy metal precipitate.

2. Discussion of Prior Art

Many industrial processes, and in particular mining operations, are known to generate acidic effluent waste water containing high levels of heavy metal ions. In response to environmental concerns, governmental regulatory agencies have placed fairly low limits on the permissible concentration of these heavy metals in the waste waters. Various methods have been developed to treat industrial waste water to conform to regulatory requirements.

Conventional methodology is to precipitate the metals as hydroxides by elevation of the pH of the acidic aqueous effluent containing the heavy metal ions. Such methods are not free from problems associated with management of the precipitates produced. Metal hydroxides generally form gelatinous colloidal precipitates which are bulky and difficult to efficiently remove from the aqueous slurry. Settling is a difficult and slow process. Management and storage of the precipitate is problematic due to the high water content and poor quality of the precipitate.

U.S. Pat. Nos. 4,338,200, 5,128,047 and 5,262,063 disclose stepwise adjustment of pH to precipitate heavy metal hydroxides. However, these methods will produce colloidal precipitates because the pH adjustments are in large increments and seed particles are not introduced to provide surfaces for secondary nucleation.

In Pat. No. 4,278,539, Santhanam et al teach crystal growth of heavy metal sulfides by maintaining a crystallization zone where the supersaturation level is maintained at a low level. However, this method is effectively directed to precipitation at a fixed pH and does not incorporate the use of recycling seed crystals to provide surfaces for secondary nucleation.

SUMMARY OF THE INVENTION

It is an object of this invention to provide a dense high quality precipitate of heavy metal hydroxides from industrial waste water and mining leachate. It has been determined that a superior quality precipitate results when the saturation ration, namely the ration of the concentration of the heavy metal hydroxide in the slurry to the solubility concentration of the heavy metal hydroxide, is maintained at a low value. This process requires that the pH be adjusted in a series of small increments.

It has further been determined that when the saturation ratio is maintained at a low value, secondary nucleation onto seed crystals is favoured. Therefore, the quality of the precipitate can be enhanced by recycling slurry containing metal hydroxide seed crystals.

Accordingly, the invention provides a method of producing superior quality metal hydroxide precipitate by incremental adjustment of the pH to maintain a low saturation ratio and recycling the slurry to provide seed crystals for secondary nucleation.

DETAILED DESCRIPTION OF THE INVENTION

The precipitation process which gives rise to heavy metal hydroxide crystals operates by two principal mechanisms, namely, nucleation and growth. Both mechanisms are controlled by the saturation ratio of the precipitating solution. High levels of supersaturation promote homogenous nucleation and the production of colloids. Secondary (surface) nucleation which results in crystal growth predominates at lower supersaturation levels. Surface growth may be enhanced by increased mass transfer of the solute through agitation of the solution.

Figure 1:
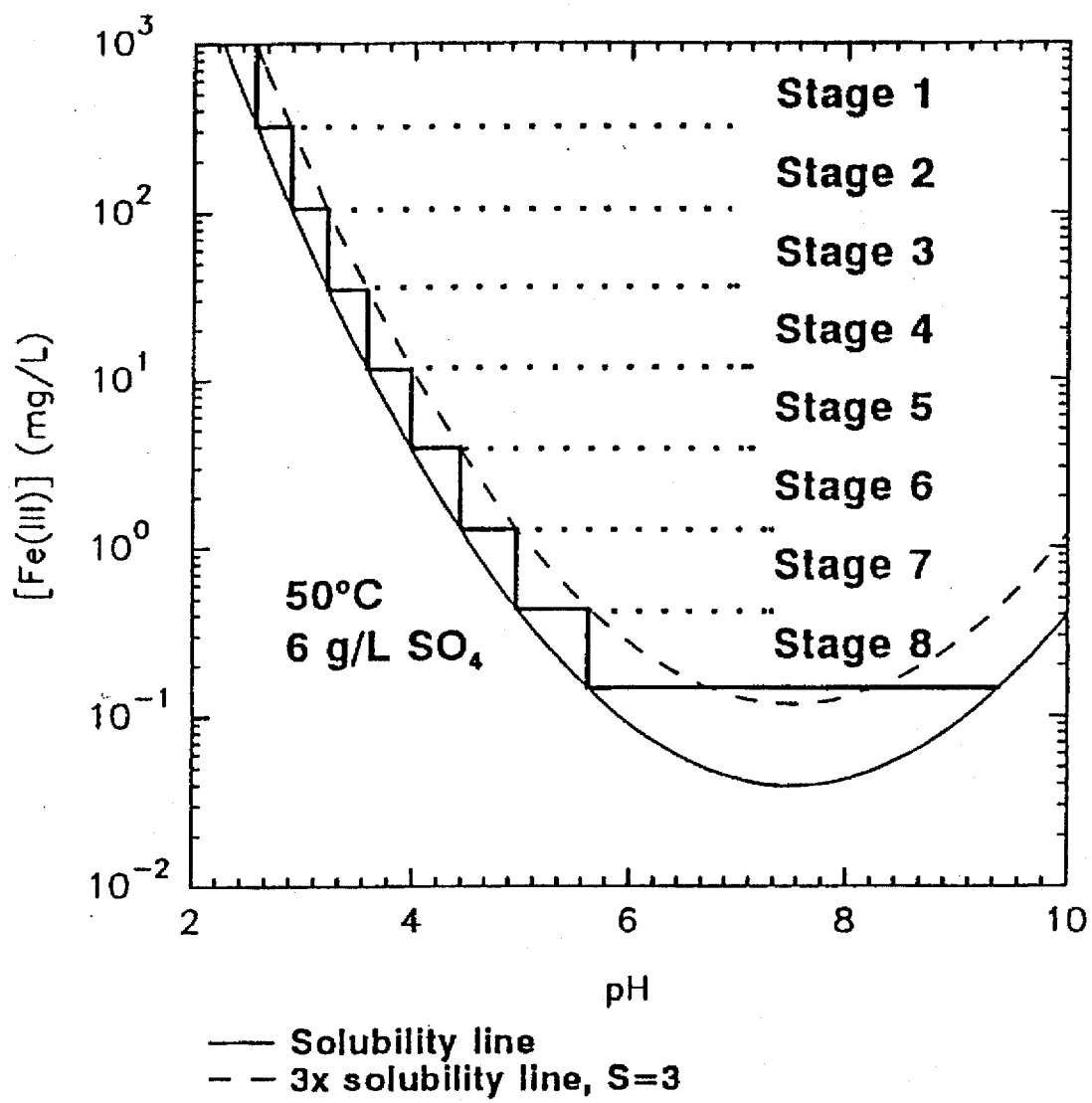
FIG. 1 shows precipitation stages required to effectively remove Fe(III) from solution by means of hydrolysis/neutralization.

FIG. 1 depicts precipitation of Fe(III) at a supersaturation ratio of 3 at 50° C. The solid line represents the solubility curve of the metal hydroxide and the broken line represents concentrations three times saturation. A synthetic effluent containing 1 g/L Fe(III) and 6 g/L $SO_4^{-2}$ was prepared and heated to 50° C. The pH was adjusted at a rate of $1.6 \times 10^{-4}$ moles $OH^-$/min. in discrete pH steps as shown in FIG. 1. The reaction time to equilibrium at each stage was determined by hydroxyl ion demand. When the addition of NaOH to maintain a particular stage was nil or less than approximately 0.025 millimoles $OH^-$ per minute, the system was assumed to be in steady state. Reaction times at each stage are listed in Table 1.

TABLE 1

Summary of neutralization times at 50° C. for each of the 8 stages shown in FIG. 1. $OH^-$ was added at a rate of $1.6 \times 10^{-4}$ moles/min.

| Stage # | Initial pH | Final pH | Reaction Time (min.) |
|---|---|---|---|
| 1 | 2.55 | 2.84 | 60 |
| 2 | 2.84 | 3.20 | 45 |
| 3 | 3.20 | 3.58 | 30 |
| 4 | 3.58 | 4.00 | 20 |
| 5 | 4.00 | 4.48 | 20 |
| 6 | 4.48 | 5.00 | 20 |
| 7 | 5.00 | 5.69 | 20 |
| 8 | 5.69 | 9.29 | 20 |

Figure 2:
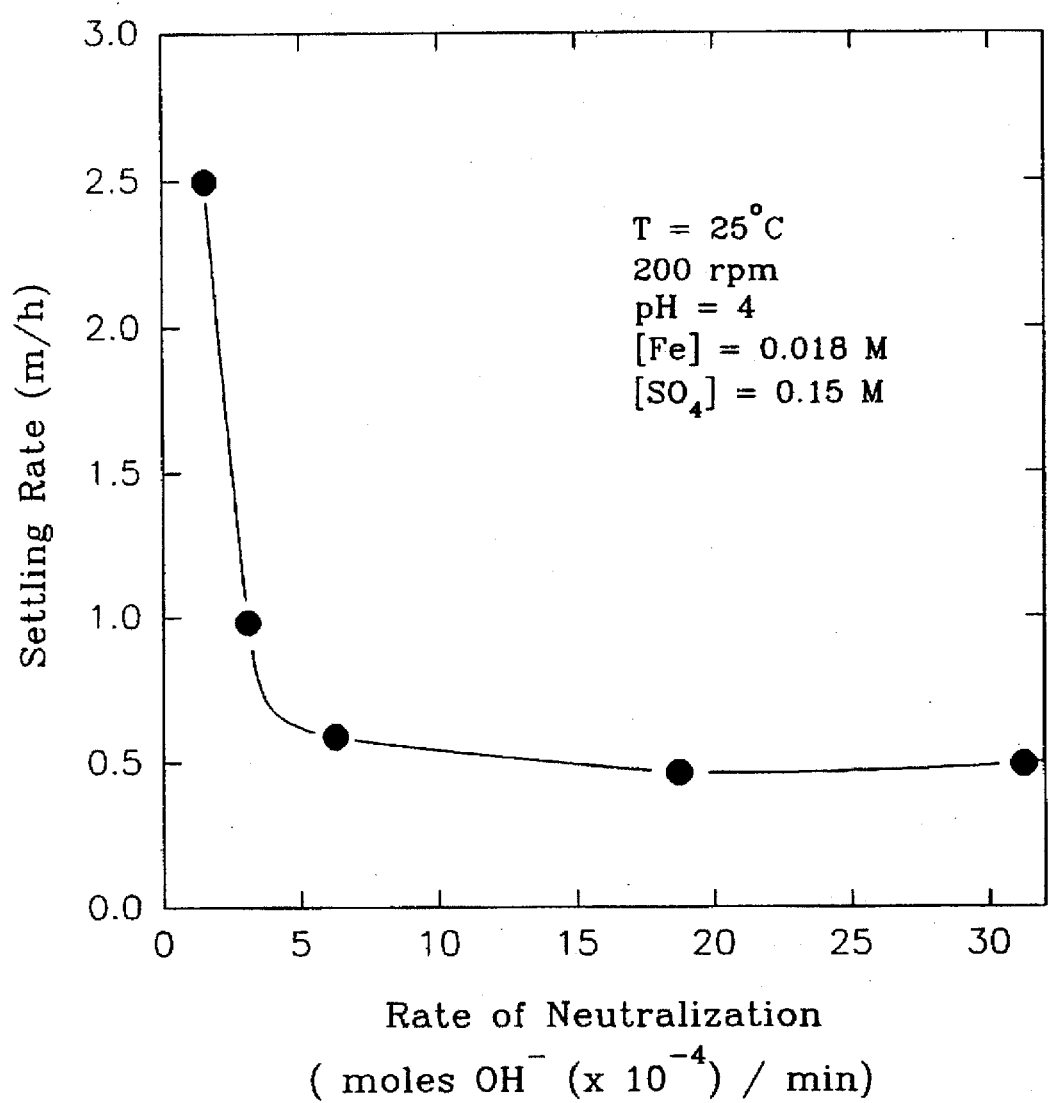
FIG. 2 shows a curve of the effect of neutralization rate on the rate of settling.
Figure 3:
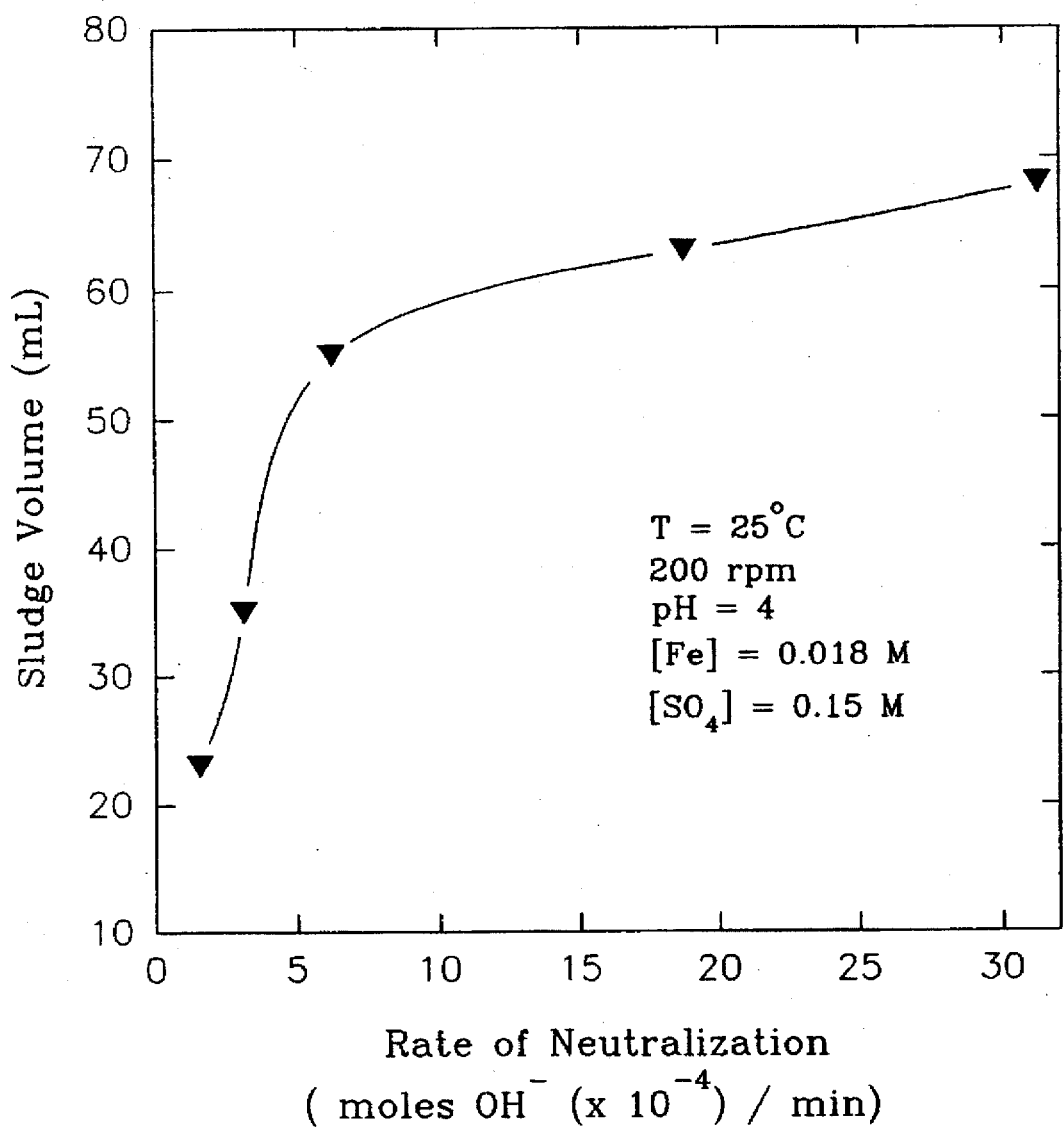
FIG. 3 shows a curve of the effect of neutralization rate on the sludge volume.

The rate of neutralization, significantly affects the settling rate of the sludge, and the sludge volume as shown in FIGS. 2 and 3. The stepwise adjustment of the pH and the maintenance of a low saturation ratio cooperate to minimize the sludge volume and maximize the settling rate. A reduced sludge volume is preferred in order to minimize the volume of sludge required for recycling. The problems associated with waste management and storage are minimized by an increased rate of settling and a reduced sludge volume.

The sludge to be recycled was introduced at stage 1 to provide seeds and facilitate secondary nucleation. Dissolution tests for the recycled sludge indicated very little precipitate dissolution occurred at pH 2.5. The dissolution results are shown in Table 2.

TABLE 2

Redissolution of Fe. Approximately 1 g of precipitate was added to 300 mL of acidified water and agitated for 2 hours. Concentrations of Fe in solution were determined by atomic absorption.

| pH | $[Fe]_r$ (mg/L) |
|---|---|
| 2.5 | 0.47 |
| 3.0 | 0.07 |
| 3.5 | 0.03 |
| 4.0 | 0.04 |
| 5.0 | 0.04 |
| 6.0 | 0.04 |

Figure 4:
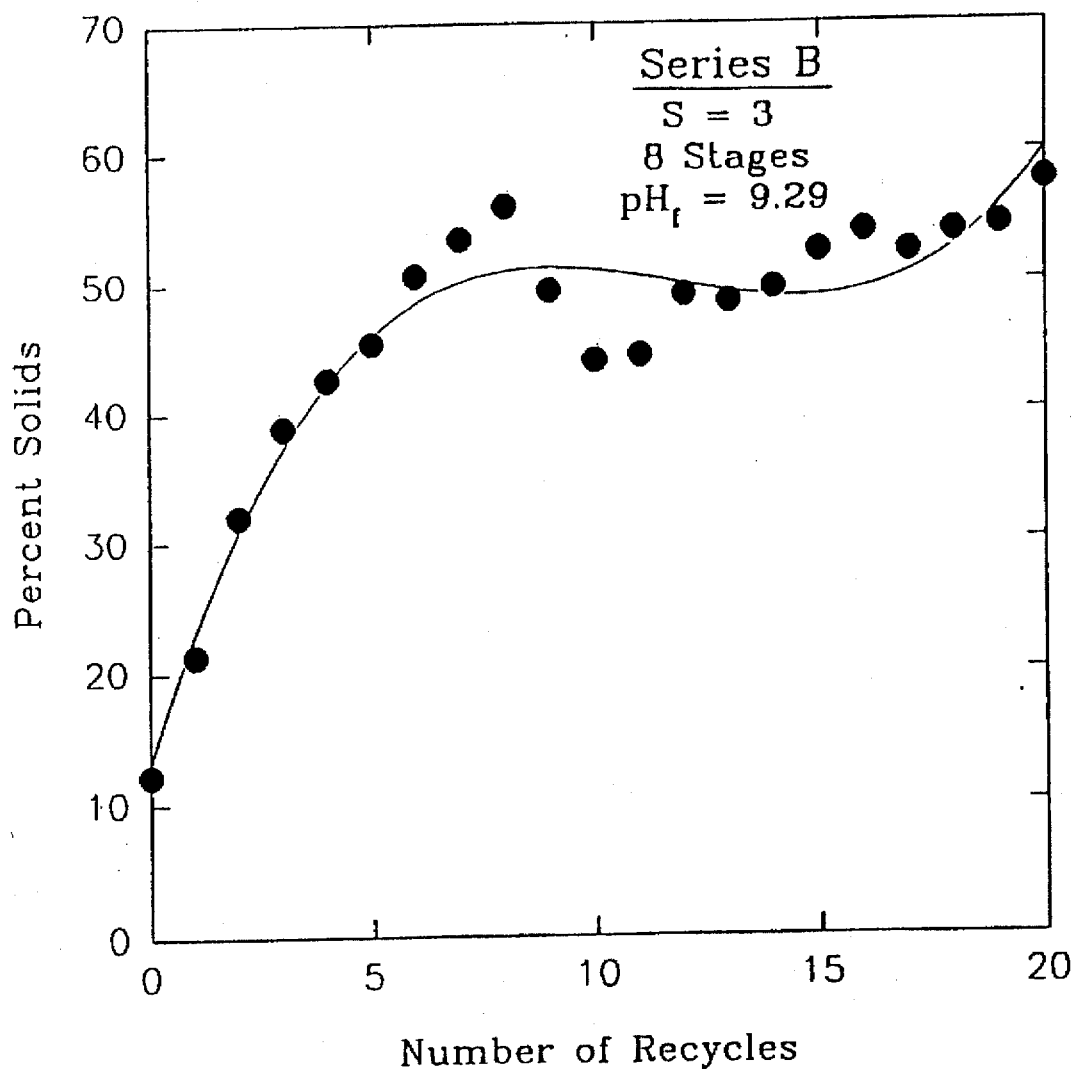
FIG. 4 shows a curve of the effect of recycling on the densification of the sludge.

The effect of recycling is shown in FIG. 4. The percent solids increased from approximately 12% to approximately 55% after eight recycles, comprising a densification factor (55%:12%) of about 4.6. Densification of Fe containing sludge reached a plateau at eight recycles with a slight increase after 20 recycles. On an industrial scale, the number of recycles should be limited to eight or less where caustic soda is used as the precipitating agent.

Figure 5:
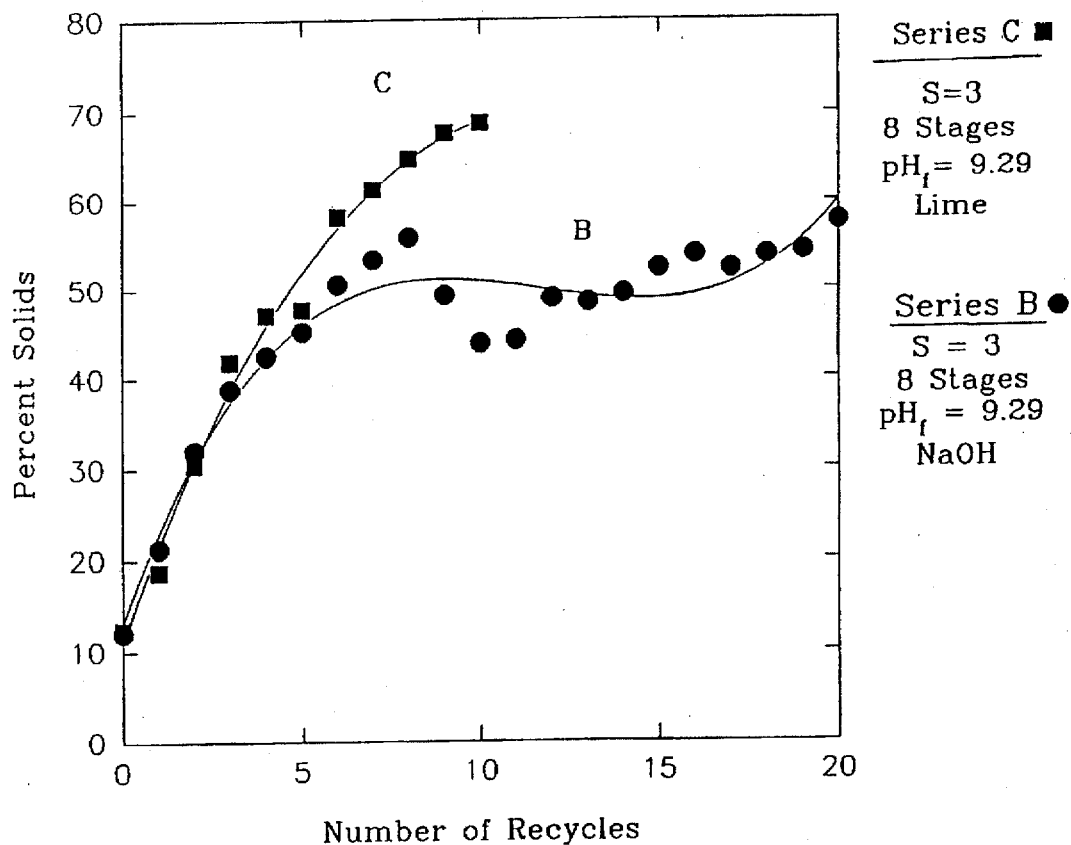
FIG. 5 shows a comparison of the densification of precipitate by recycling using NaOH (●) or lime (■).

Densification of the sludge may be enhanced by adjusting the pH with lime in place of caustic soda. These results are shown graphically in FIG. 5. In an eight stage pH cycle where the sludge was recycled eight times, densification of synthetic effluent yielded in excess of 60% solids using lime as compared to about 55% using NaOH. Two additional recycles increased densification to approximately 70% where lime was used. These results are particularly significant in that lime is the industrial preferred reagent for pH adjustments.

Figure 6:
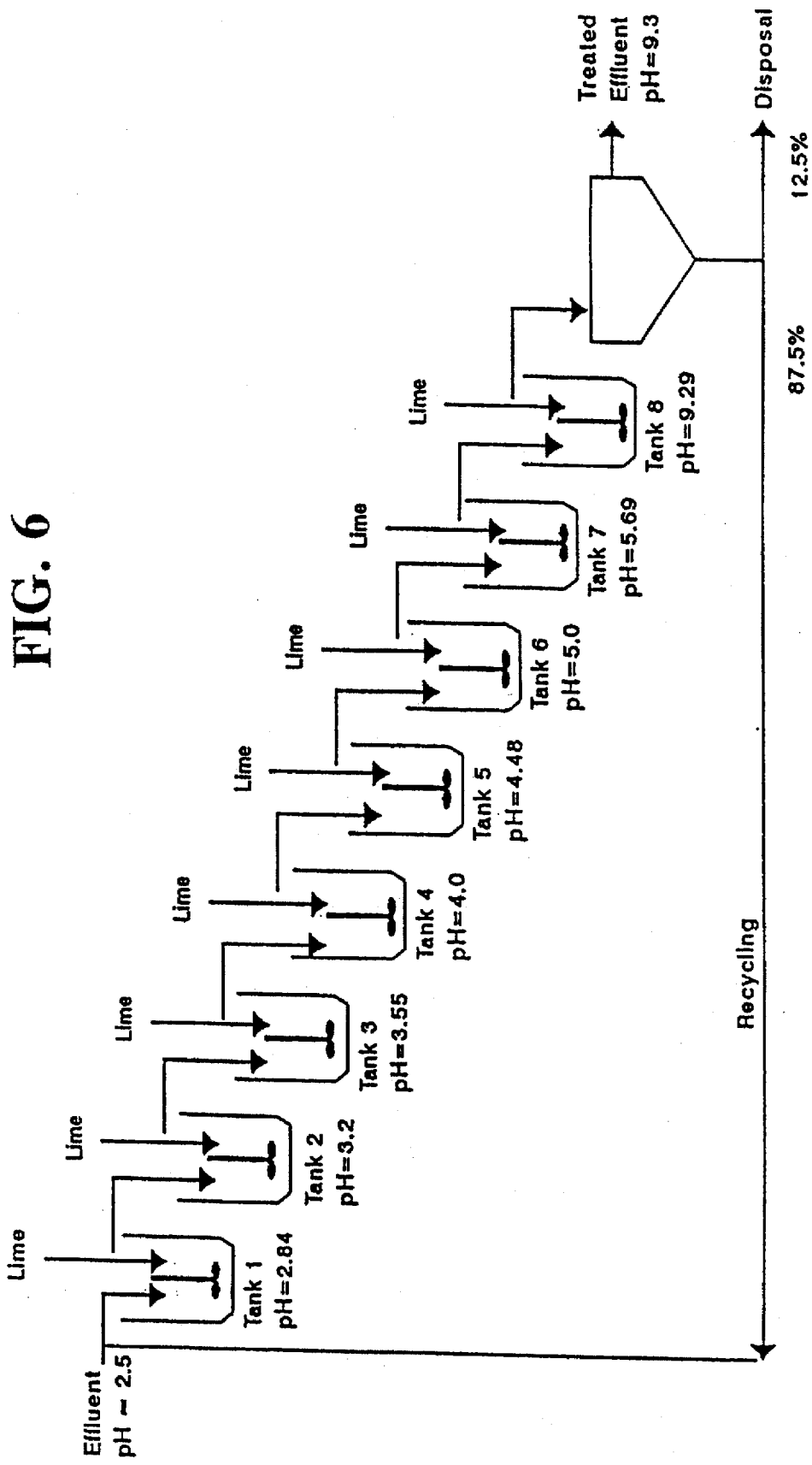
FIG. 6 is a schematic representation of an apparatus for industrial scale precipitation of heavy metal hydroxides in effluent waste water.

A cascade design for staged neutralization on an industrial scale is schematically represented in FIG. 6. The apparatus comprises a series of precipitation tanks which are maintained at predetermined pH levels. The optimal pH for each vessel will depend on the nature of the heavy metals in the effluent water. The number of reaction vessels and the appropriate pH can be determined from a compound solubility curve of the hydroxides of the various heavy metal contaminants in the waste water. Experimental test runs will be required to determine the optimal pH for each precipitation tank. Where the effluent water contains more than one heavy metal contaminant, it may be necessary to include internal recycling loops to maximize secondary nucleation and crystal growth.

Acid mine drainage (AMD) from a Canadian gold mine was treated according to the method of the invention. The water was heated to 50° C. and neutralized with lime in an eight stage scheme. Sludge densification reached a plateau after six recycles. The precipitate contained 23% solids with a densification ration of four. Chemical analysis of the precipitate showed that it contained 68% gypsum and significant amounts of Fe(III), Mg and Al as hydroxides. The chemical composition of the AMD effluent before and after treatment and the composition of the precipitate are shown in Table 3.

TABLE 3

Chemical composition of the AMD, the treated effluent, and the dry treatment sludge.

| Contaminant | Solution (mg/L) | Treated Solution (mg/L) | Composition of Precipitate (%) |
|---|---|---|---|
| SO₄ | 5550 | 1400 | 36.84 |
| Al | 438.3 | <0.1 | 4.70 |
| Ca | 133 | 653 | 16.33 |
| Cd | 5.3 | <0.1 | <0.01 |
| Cu | 5 | <0.1 | 0.05 |
| Fe | 810 | 0.5 | 8.96 |
| Mg | 378 | 4.9 | 4.27 |
| Mn | 28 | <0.1 | 0.30 |
| Ni | 1 | <0.1 | 0.01 |
| Pb | <0.1 | <0.1 | <0.1 |
| Zn | 2.3 | 0.013 | 0.04 |
| pH | 2.5 | 9.3 | — |

Figure 7:
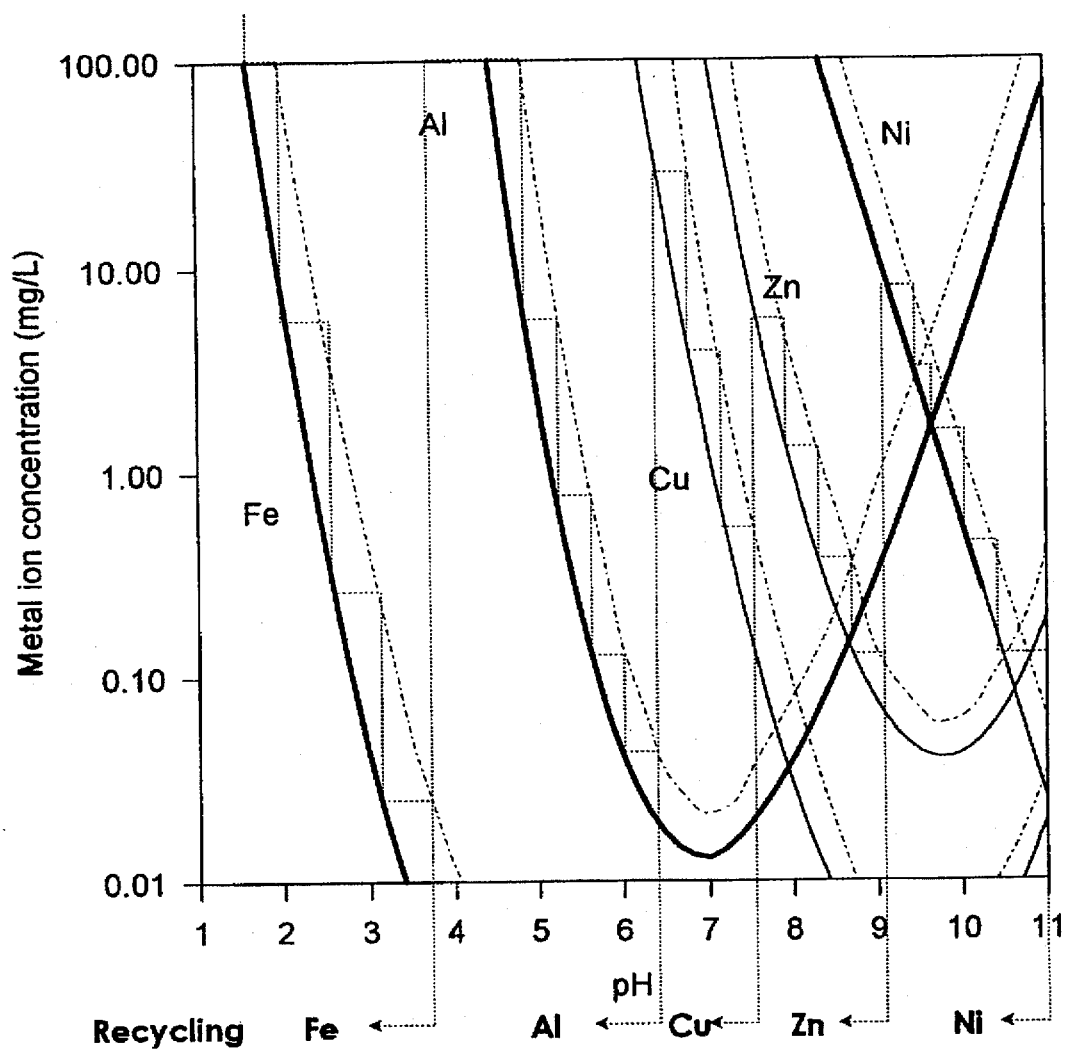
FIG. 7 shows a compound solubility curve of heavy metal ions.

As a further embodiment of the invention, the following example is provided. The solubility curves of Fe, Al, Cu, Zn and Ni and the pH adjustments necessary to maintain a fixed saturation ratio for each metal are shown in FIG. 7. To maximize sludge density in a solution containing these heavy metals, the sludge should be recycled (a) between about pH 1 and about pH 4 to maximize densification of the Fe, (b) between about pH 4.5 and about pH 6.5 to maximize the densification of Al, (c) between about pH 6.2 and about pH 7.5 to maximize the densification of Cu, (d) between about pH 7.5 and about pH 9 to maximize the densification of Zn, and (e) between about pH 9 and about pH 11 to maximize the densification of Ni.

The pH stages are shown in broken lines on FIG. 7.

At any particular industrial site, the number of precipitation tanks, the appropriate pH level of each tank and the sludge recycling scheme will depend on (a) the saturation ratio selected, (b) the heavy metals present in the effluent water, and (c) the relative concentrations of each.

It will be seen that the objects set forth above, are efficiently attained and, since certain changes may be made in carrying out the above method without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. A method of preparing a heavy metal hydroxide precipitate from an acidic aqueous solution containing more than 25% solids including ions of said heavy metal hydroxide, by upward adjustment of the pH of said acidic aqueous solution from a first lower level to a second higher level, said method comprising the steps of:

(a) determining the solubility curve of said heavy metal hydroxide;

(b) selecting a saturation ratio;

(c) plotting the solubility curve and a supersaturation curve at said saturation ratio;

(d) determining the incremental pH stages between said solubility curve and said supersaturation curve required to upwardly adjust the pH without exceeding said saturation ratio;

(e) adjusting the pH of the acidic aqueous solution upward from said first low level to said second higher level in said incremental pH stages thereby providing a sludge of metal hydroxide; and (f) recycling all or part of said sludge of metal hydroxide through all or some of said incremental pH stages.

2. The method of claim 1 wherein said acidic aqueous solution is acidic industrial waste effluent or acidic mine drainage.

3. The method of claim 1 wherein said acidic aqueous solution contains more than one heavy metal ion.

4. The method of claim 1 wherein said low supersaturation ratio is greater than 0 and less than 5.

5. The method of claim 4 wherein said low supersaturation ratio is 3 or less.

6. The method of claim 1 wherein the pH is adjusted with a base selected from NaOH and lime.

7. The method of claim 1 wherein all or part of said sludge is recycled through all or some of said incremental stages between 1 and 10 times.

8. A method of preparing a heavy metal hydroxide precipitate from acidic industrial or mine effluent containing more than 25% solids, comprising the steps of:

(a) determining the heavy metal ions in the effluent and the solubility curves of the hydroxides of said heavy metal ions;

(b) selecting a saturation ratio of greater than 0 and less than 5;

(c) plotting the solubility curves and supersaturation curves at said saturation ratio;

(d) determining the incremental pH stages between said solubility curve and said supersaturation curve associated with said hydroxides required to upwardly adjust the pH without exceeding said saturation ratio;

(e) adjusting the pH of the acidic aqueous solution upward in said determined incremental pH stages to provide a sludge or sludges of metal hydroxides; and (f) recycling all or part of said sludge or sludges through some or all of said incremental pH stages.

9. The method of claim 8 wherein the sludges are recycled in internal loops between pH values determined from said solubility curves of said heavy metal ions.

* * * * *